July 19, 1960  H. PAJENKAMP ET AL  2,945,688
PROCESS FOR MANUFACTURING WHITE CEMENT
Filed Feb. 6, 1959
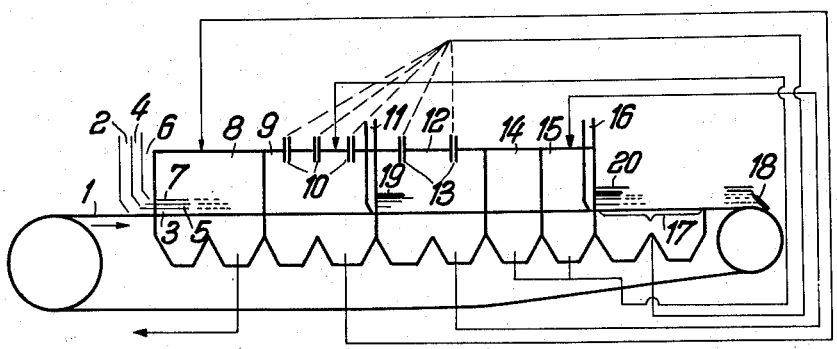
Inventors:
Horst Pajenkamp
Alfred Russ
Heinrich zur Strassen
Kurt Meyer
Hans Rausch
By
Bailey, Stephens + Huettig
Attorneys

2,945,688

PROCESS FOR MANUFACTURING WHITE CEMENT

Horst Pajenkamp, Wiesbaden, Alfred Russ and Heinrich zur Strassen, Wiesbaden-Biebrich, Kurt Meyer, Frankfurt am Main, and Hans Rausch, Oberursel, Germany, assignors to Dyckerhoff Zementwerke Aktiengesellschaft, Wiesbaden-Amoneburg, and Metallgesellschaft Aktiengesellschaft, Frankfurt, Germany Filed Feb. 6, 1959, Ser. No. 791,607

Claims priority, application Germany Mar. 18, 1958

9 Claims. (Cl. 263—53)

This invention relates to a process and apparatus for producing white cement.

White colored cements are made by burning in a reducing atmosphere raw powdered materials containing as little as possible of coloring components such as Fe and Mn. The exclusion of the burned material from oxygen during cooling favors the whiteness. Following the burning of the material, the hot clinker is treated with a reducing gas before cooling, and then cooled in a reducing atmosphere. A further whitening of the clinker occurs if the clinker is quickly cooled, as for example by immersion in water. These prior art processes are performed only in a rotary furnace since other furnaces, as a shaft furnace or a sintering band, do not permit the keeping of a reducing or neutral atmosphere in the furnace, and also these furnaces depend at least partly upon the addition of solid fuels to the raw materials. The ashes of the solid fuels introduce unwanted coloring components into the burned clinker.

More recently, a process has been suggested in which the burned clinker is kept hot in a reducing atmosphere for a longer period than heretofore before it is cooled to 900° C. At this point, a longer cooling period takes place down to at least 700° C. in a reducing or inert atmosphere. Finally, the hot material is cooled to atmospheric temperature.

It has now been recognized that a uniform burning of the raw material with an improvement in the whiteness of the burned clinker can be obtained if the individual steps of the foregoing process, including preheating and drying, sintering or burning, finishing reducing burning after treatment in a reducing atmosphere, intermediate reducing cooling, and final cooling, are sharply separated from each other and the operating conditions in each step, especially the temperature and the degree of reductivity or oxidativeness atmospheres are exactly and rigidly controlled within very narrow limits.

The exact separation of the individual treating zones and the control of these zones could not be obtained in the apparatus heretofore used by the prior art. It is impossible to sharply separate the individual zones in a rotary or a shaft furnace.

The object of this invention is to produce white cement clinker in sharply separated steps or zones upon a sintering band or apparatus.

Contrary to the conventional sintering bands which operate with a 300 to 500% excess of air, this invention is based upon the discovery that individual sharply separated gas treatment zones can be obtained on a sintering band, especially to maintain a predetermined degree of reductivity or oxidativeness of the gas atmospheres within very narrow limits in the zones requiring a specific degree of reducing or oxidation conditions.

This invention has also found that, with a given raw powder material composition, a whiter clinker can be obtained if pellets of the raw powdered material are used. The size and uniformness of the pellets is important for the obtaining of whiteness and also for getting a thoroughly burned clinker. It has been found that it is much more difficult to obtain a thorough burned clinker from a material suitable for white cement than it is for a material producing a clinker for grey cement. Granules of a size and size distribution (spectrum of diameters) suitable for grey cement are not generally sufficient for obtaining, under the same conditions, a thoroughly burned white cement clinker.

In order to achieve a thorough and uniformly burned white clinker, it has been found that the raw material must be started in such a form and maintained in that form until the end of the treatment so that no particles less than 2 mm. and no greater than 15 mm. are present at any time. The best results are obtained with pellets of from 6 to 8 mm., which pellet size is maintained throughout the entire treating process.

A further feature of this invention is in that under the same conditions the whiteness of the clinker is improved as the pellets are kept smaller. Consequently, the range of pellets of from 2 to 15 mm. and preferably from 6 to 8 mm. gives the best results, both for the uniform thorough burning of the clinkers and the whiteness of the clinker.

It has also been found that the pellets used within the given range should not differ from each other in their diameters by more than ±1.5 mm.

The given conditions of pellet size and color which are necessary in order to obtain a thoroughly burned clinker are also the desired conditions for retaining the whiteness of the clinker in the reducing cooling and final cooling of the clinker.

These strict requirements for size and uniformity of the pellets could not be fulfilled by the use of rotary furnaces. In rotary furnaces, a mixture of material ground off the clinkers and agglomerations and conglomerations are constantly being formed during the bringing up to sintering temperature and the sintering of the raw materials even if raw material particles of absolutely uniform size were initially charged to the furnaces. Such mixture contains dust below 0.2 mm. and coarse particles up to 50.0 mm.

The use of the sintering band in this invention has the particular advantage of keeping a uniform pellet size of the material throughout the entire process from the charging of the raw material onto the sintering bed to the finally cooled clinkers.

A two-zone sintering process is especially feasible in the process of this invention as the waste heat of the gases drawn through a second (upper) layer of material is used to preheat the first (lower) layer and the thus pre-treated pellets of the lower layer are then passed into the upper layer and burned directly by the hot gases, the discharge of the upper layer forming the end product of the process.

The temperatures and the degree of reductivity or oxidativeness in the individual zones are determined according to the composition of the raw materials and the proportion of the thickness of the first zone with respect to the second zone. A maximum temperature of 1480° C. should not be exceeded in the upper zone, while a minimum temperature of about 1430° C. is necessary in this zone for most raw material compositions.

Another feature of the invention is in that it is not necessary to sinter entirely within a reducing atmosphere. The sintering can be separated if desired into an oxidizing zone and a reducing zone wherein the reducing zone would follow the oxidizing zone and precede their after-treatment reducing zone. The time the material is exposed in the reducing zone is adjusted to the composition of the raw material. Also, the separation of the sintering into a non-reducing and a reducing zone is advantageously made so that the gases exhausted from the reducing zone are adequate in quantity and composition for a reducing after-treatment zone and a cooling zone. However, the burning in a reducing atmosphere must occur before the maximum allowable sintering temperature for the composition of the raw material is reached.

As the whiteness of the sintered clinker can also be affected by over-reducing, especially when the sulfates of Fe, Mn and Zn and the like are present, a further feature of this invention provides for the adjustment of the gaseous atmosphere in the reducing zones to the optimal degree for obtaining the best reducing conditions. This is done by admixing reducing, inert and weakly oxidizing gases into the heating gas. It is to be understood that the oxidizing gases are not actually air or oxygen but gases such as steam or $CO_2$ which can adjust overly reduced parts of the raw material, as, for example, iron, into the desired degree of oxidation as, for example FeO.

In the after-treatment zone, the sintered clinker is cooled gradually, i.e. within from 10 to 60 minutes to a temperature not less than 900° C. by means of drawing reducing gases through the clinker.

The rate of cooling of the clinker within the after-treatment zone is controlled by adjusting the temperature of the gases drawn through the cooling zone to a temperature of from about 800 to 1200° C. Preferably reducing gases having a temperature of from 1000 to 1100° C. are used. These gases are drawn through the clinker at a very low speed of about from 10 to 40, and preferably 20, m.$^3$/m.$^2$ per hour. In special cases, no gas is drawn through the clinker in this zone. Following the after-treatment zone is a reducing cooling zone in which reducing gases at a higher speed are drawn through the clinker.

According to the invention, gases having a temperature of from about 200 to 400° C. are used for the reducing cooling of the clinker rather than gases at atmospheric temperature. It has been found that the whiteness of the clinker is further improved if the clinker is cooled slowly.

The layers of the various materials employed in the sinter bed and the adjustment of the temperatures are such that all of the pellets in the lower layer of raw material reach or exceed a temperature of 1000° C. at least once during each passage. If very readily sinterable materials are treated, part of the material treated in the lower zone can be admixed directly to the output of the process, i.e. to the discharge of the upper layer.

After the clinker has passed through the reducing cooling zone and is cooled below a temperature at which contact with an oxidizing gas would cause discoloring, namely below a temperature of about 400 to 500° C., the final cooling is accomplished by means of air at atmospheric temperature.

The forming of the sinter bed according to the invention is accomplished by forming a grate protecting bottom layer of inert pellets having a diameter larger than the raw material pellets to be sintered. This makes possible the sieving out of the grate layer at the end of the sinter band. The large pellets are recycled and must not contaminate the sintered white clinker. Consequently, the use of the large pellets prevents the small impurities picked up by the grate layer during sintering from reaching the finished white clinker.

The invention also employs the use of a thin layer of pre-burnt white clinker on top of the sintered raw material leaving the reducing sintering zone. This protecting layer makes inactive traces of oxidizing gas particles which may be contained in the gas used in the reducing after-treatment. This upper layer is composed of the fines sieved from the sintered white clinker at the end of the sinter band, which fines can be again sieved out and recycled and thus not included in the finished white clinker.

The means by which the objects of the invention are obtained are described more fully with reference to the accompanying schematic drawing of a sintering apparatus.

The sintering band 1 moving in the direction of the arrow receives first from hopper 2 a lowermost grate protecting layer 3 of inert material. From hopper 4, a second layer 5 of raw or green pellets ranging from 6 to 8 mm. diameter is applied; and from hopper 6, a layer 7 of pre-burned pellets is applied. The raw material forming the green pellets in layer 3 had the following impurities:

| | Percent |
|---|---|
| $Fe_2O_3$ | 0.45 |
| MnO | 0.03 |
| $Cr_2O_3$ | 0.042 | a Si-modulus of 4.0 and a Kuehl lime-standard of 90.

The sintering band 1 had a total surface area of 20 m.$^2$, and the raw or green pellets forming layer 5 had a moisture content of 12.2%. The pellets were applied on layer 5 at the rate of 6 metric tons per hour. The pellets on grate layer 3 were applied at 1.7 metric tons per hour, and the pellets in layer 7 at 3.4 metric tons per hour. The speed of band 1 was such that the total thickness of the band, including layers 3, 5 and 7, was 42 cm.

The bed so formed first passed beneath drier hood 8 beneath which the material was heated with gases ranging from 300° C. at the entrance to hood 8 to 400° C. at the exit from the hood. A sintering or burning zone follows the drying zone. Hood 9 enclosing burners 10 produced combustion gases at a temperature from 1000° C. at the entrance of hood 9 to 1400° C. at the exit of hood 9 which were drawn through the bed of the band 1. These were oxidizing combustion gases. This oxidizing zone was separated gas-tight from the following reducing burning zone by means of hopper 11, through which was placed upon layer 7 a layer 19 of pre-burned finished clinker of a size from 0 to 4 mm. The band then passed through a reducing burning zone covered by hood 12 having burners 13 which produced gases at a temperature of 1400° increasing to 1460° C. which were drawn through the bed. In the drying zone and both oxidizing and reducing burning zones, the gases were drawn through the bed at a vacuum of 300 mm. water column. Following the reducing burning zone of hood 12 is an after-treatment zone covered by hood 14 and from which reducing gases of 1050° C. were drawn through the bed by a greatly reduced vacuum of 20 mm. water column. The material remained in this after-treatment zone for about 8 minutes and then passed into the reducing cooling zone covered by hood 15. In this zone, reducing gases at a temperature of 400° decreasing to 200° were drawn through the bed in a manner such that no portion of the upper layer had a temperature greater than 500° C. when leaving this zone. Gas was drawn through the bed at a vacuum of 400 mm. water column.

The reducing cooling zone under cover 15 was separated from the atmospheric portion of the apparatus by hopper 16 from which a layer 20 of fine finished clinkers of from 0 to 4 mm. was placed upon layer 19. The material covered by layer 20 was cooled to an average temperature of 100° C. by means of atmospheric air in zone 17. A scraper 18 mounted at the outlet end of the band separated the layers 19 and 20 from the layers 3 and 5.

The grate layer 3 is then separated from layer 5 by means of sieves, and the coarse grate particles recycled to hopper 2. The fines from layer 5 were separated by means of sieves, and returned to hoppers 11 and 16. The layer 5 was separated from the finished white clinker of layer 7 and returned to hopper 4.

The gases drawn through the drying zone under hood 8 are discarded into the atmosphere. The exhaust gas from the oxidizing burning zone under hood 9 is recycled to hood 8. The exhaust gas from the reducing sintering zone under hood 12 is recycled to the hood 15 of the reducing cooling zone. Exhaust gas from the after-treatment zone under hood 14 and the reducing cooling zone under hood 15 are mixed with the gas used in the oxidizing burning zone under hood 9. The heated air drawn through the final cooling zone 17 was recycled as combustion air in the burners 10 and 13 of the sintering zone.

The finished clinker, when ground at a specific surface according to Blain of 4000 cm.$^2$/gr., had a whiteness of 90.4, as measured from a white standard of 100 of MgO. The same raw material treated according to conventional methods produced a clinker which had a whiteness of not more than 82.7, when ground to the same fineness.

Having now described the means by which the objects of the invention are obtained, we claim:

1. A process for the production of white cement clinker from powdered raw material having a low Fe, Cr and Mn content comprising forming green pellets of said material with the individual pellets not differing from each other more than plus or minus 1.5 mm. in diameter and lying in the range of from 2 to 15 mm., laying a bed of said pellets on a horizontally moving grate of a sintering band, drawing hot gas through said bed while moving said grate and bed through a first zone to heat said pellets to a sintering temperature, drawing hot reducing gases through the heated pellets while moving said grate and bed through a second zone to burn and sinter said pellets, moving said grate and bed into an after-treatment zone while subjecting said bed to contact with reducing gases cooler than the gases in said second zone, drawing cool reducing gases composed of waste gas from said second zone through said bed while moving said grate and bed through a third zone to cool said pellets in a reducing atmosphere to a temperature below their oxidizing temperature, and then further moving said grate and bed to a final zone to cool said pellets to atmospheric temperature.

2. A process as in claim 1, further comprising cooling said pellets in after-treatment and third zones with a less volume of reducing gas than used to sinter said pellets in said second zone.

3. A process as in claim 2, further comprising adding a gas selected from a group consisting of water vapor and carbon dioxide to the cooling reducing gas in said third zone.

4. A process as in claim 1, said gases in said after-treatment zone having a temperature ranging from 1000 to 1100° C.

5. A process as in claim 4, said gases in said third zone having a temperature ranging from 200 to 400° C.

6. A process as in claim 5, said gases in said first zone having a temperature ranging from 1000 to 1400° C., and said gases in said second zone having a temperature ranging from 1400 to 1480° C.

7. A process as in claim 6, further comprising forming a lower layer of green pellets on the sintering band, and superimposing thereon an upper layer of recycled pretreated pellets discharged from said lower layer.

8. A process as in claim 7, further comprising adjusting the ratio of thickness of said upper and said lower layer so that the lowermost green pellets reach a sintering temperature of at least 1000° C.

9. A process for producing white cement clinkers comprising forming substantially uniform size green pellets of white cementitious material, laying a bed of said pellets on the horizontally moving grate of a sintering band, heating said pellets to sintering temperature with hot gases drawn downwardly through said bed, covering said heated pellets with a layer of inert material to exclude oxidizing gases from said bed, drawing hot reducing gases downwardly through said bed for sintering said pellets, after-treating said pellets in a reducing atmosphere at a less temperature than that of said hot reducing gases, further cooling said pellets by drawing through said bed the waste reducing gases obtained from the hot reducing gases drawn through said bed and containing no oxygen to cool said pellets to below their oxidizing temperature, and finally air cooling said pellets to atmospheric temperature.

References Cited in the file of this patent
UNITED STATES PATENTS

| | | |
|---|---|---|
| 2,167,120 | Lloyd | July 25, 1939 |
| 2,174,066 | Ahlmann | Sept. 26, 1939 |
| 2,283,758 | Pike | May 19, 1942 |